(12) United States Patent
Kwiecien et al.

(10) Patent No.: US 12,373,084 B2
(45) Date of Patent: Jul. 29, 2025

(54) WEB-BASED DATA UPLOAD AND VISUALIZATION PLATFORM ENABLING CREATION OF CODE-FREE EXPLORATION OF MS-BASED OMICS DATA

(71) Applicant: Wisconsin Alumni Research Foundation, Madison, WI (US)

(72) Inventors: Nicholas William Kwiecien, Madison, WI (US); Michael Scott Westphall, Fitchburg, WI (US); Joshua Jacques Coon, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 82 days.

(21) Appl. No.: 17/360,806

(22) Filed: Jun. 28, 2021

(65) Prior Publication Data
US 2022/0057902 A1 Feb. 24, 2022

Related U.S. Application Data

(63) Continuation of application No. 16/049,419, filed on Jul. 30, 2018, now abandoned.
(Continued)

(51) Int. Cl.
*G06F 3/0482* (2013.01)
*G06F 16/95* (2019.01)
(Continued)

(52) U.S. Cl.
CPC ............ *G06F 3/0482* (2013.01); *G06F 16/95* (2019.01); *G06F 16/958* (2019.01);
(Continued)

(58) Field of Classification Search
CPC ...... G06F 3/0482; G06F 16/95; G06F 16/958; G06Q 10/101; G06Q 10/10;
(Continued)

(56) References Cited

U.S. PATENT DOCUMENTS 9,972,105 B2 * 5/2018 Deng .................. G06F 16/9024
10,600,216 B2 * 3/2020 Mikhailov ............ G06T 3/0006
(Continued)

OTHER PUBLICATIONS

Perez de Souza et al. (2017) "From chromatogram to analyte to metabolite. How to pick horses for courses from the massive web resources for mass spectral plant metabolomics," GigaScience, vol. 6, Issue 7, 20 pages.
(Continued)

*Primary Examiner* — Andrey Belousov
(74) *Attorney, Agent, or Firm* — LEYDIG, VOIT & MAYER, LTD.

(57) ABSTRACT

The present invention provides a platform that enables codeless generation of online mass spectrometry data exploration portals. The platform facilitates upload of generic spreadsheets containing processed mass spectrometry results (e.g., peak tables) and enables on-the-fly hierarchical organization of data. Following data upload, platform users can select individual visualizations to add to their custom web portal from a menu of options. Based on these selections, a complete webpage is constructed with all associated functionality embedded. These custom web portals can then be shared with collaborators and other researchers at the discretion of the creator via a developed user permissions sharing scheme.

9 Claims, 11 Drawing Sheets

Related U.S. Application Data

(60) Provisional application No. 62/539,081, filed on Jul. 31, 2017.

(51) Int. Cl.

| | | |
|---|---|---|
| *G06F 16/958* | (2019.01) | |
| *G06Q 10/101* | (2023.01) | |
| *H01J 49/00* | (2006.01) | |
| *H04L 9/40* | (2022.01) | |
| *G06Q 10/10* | (2023.01) | |
| *G06T 11/20* | (2006.01) | |

(52) U.S. Cl.
CPC ........ *G06Q 10/101* (2013.01); *H01J 49/0036* (2013.01); *H04L 63/10* (2013.01); *H04L 63/104* (2013.01); *G06Q 10/10* (2013.01); *G06T 11/206* (2013.01); *G06T 2200/24* (2013.01); *H04L 63/105* (2013.01)

(58) Field of Classification Search
CPC .... H01J 49/0036; H04L 63/10; H04L 63/104; H04L 63/105; G06T 11/206; G06T 2200/24

See application file for complete search history.

(56) References Cited

U.S. PATENT DOCUMENTS

| | | | | |
|---|---|---|---|---|
| 10,990,247 | B1* | 4/2021 | Allspaw | G06F 3/04847 |
| 2004/0262513 | A1 | 12/2004 | Karol et al. | |
| 2005/0055193 | A1* | 3/2005 | Bondarenko | G16B 50/30 703/22 |
| 2005/0107957 | A1 | 5/2005 | Heath et al. | |
| 2006/0028471 | A1 | 2/2006 | Kincaid et al. | |
| 2006/0036425 | A1 | 2/2006 | Le Cocq et al. | |
| 2006/0047697 | A1* | 3/2006 | Conway | G16B 50/10 |
| 2006/0123349 | A1 | 6/2006 | Wakabayashi | |
| 2009/0175766 | A1 | 7/2009 | Decorral | |
| 2010/0131432 | A1 | 5/2010 | Kennedy et al. | |
| 2010/0178663 | A1 | 7/2010 | Graham et al. | |
| 2012/0191370 | A1* | 7/2012 | Roder | G16B 40/00 702/23 |
| 2013/0013221 | A1* | 1/2013 | Verseput | G06Q 10/00 702/32 |
| 2013/0185096 | A1 | 7/2013 | Giusti et al. | |
| 2013/0217589 | A1* | 8/2013 | Xu | G16B 40/20 700/266 |
| 2014/0136603 | A1* | 5/2014 | Boonyaratanakornkit | H04L 9/40 709/203 |
| 2014/0156612 | A1 | 6/2014 | Bondarenko | |
| 2015/0355190 | A1* | 12/2015 | Andrews | H01J 49/0027 530/300 |
| 2016/0048516 | A1 | 2/2016 | Guiliano et al. | |
| 2016/0092151 | A1 | 3/2016 | Yasuda et al. | |
| 2016/0170998 | A1* | 6/2016 | Frank | G06F 16/9535 707/748 |
| 2016/0246863 | A1* | 8/2016 | Sexton | G06F 16/904 |
| 2016/0267220 | A1 | 8/2016 | Becker et al. | |
| 2016/0291819 | A1* | 10/2016 | Helfman | G06F 3/04842 |
| 2017/0047209 | A1* | 2/2017 | Bailey | G01N 30/72 |
| 2017/0069118 | A1* | 3/2017 | Stewart | G06F 3/04845 |
| 2017/0207464 | A1* | 7/2017 | Gyenge | C25D 13/12 |
| 2017/0236697 | A1 | 8/2017 | Becker et al. | |
| 2018/0076012 | A1* | 3/2018 | Thoeing | H01J 49/0036 |
| 2018/0166265 | A1* | 6/2018 | Geromanos | G01N 33/68 |
| 2018/0217129 | A1 | 8/2018 | Cutillas et al. | |
| 2018/0240659 | A1* | 8/2018 | Strohalm | H01J 49/0036 |
| 2018/0254101 | A1* | 9/2018 | Gilmore | G16H 40/20 |
| 2019/0302054 | A1* | 10/2019 | Bleiholder | G01N 27/623 |
| 2021/0233605 | A1* | 7/2021 | Yoshikawa | G16B 5/00 |
| 2022/0328128 | A1* | 10/2022 | Kok | G06N 20/00 |

OTHER PUBLICATIONS

Sharma et al. (2012) "A Mass Spectrometry Proteomics Data Management Platform," Mol Cell Proteomics, vol. 11(9), 824-831.

* cited by examiner

Required Code

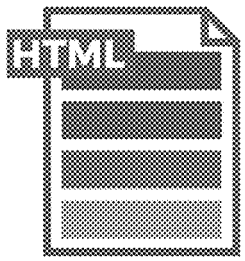

HTML. Code that describes a webpage's structure. Contains information for a webpage to be rendered in a browser.

JavaScript. Code that handles the behavior of webpages (i.e., makes visualizations work).

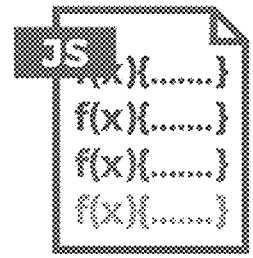

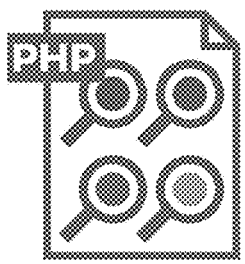

PHP. Server-side code for accessing data from a database which is hidden from users.

Barriers to Online Data Analysis

Organization of quantitative MS data into queryable databases

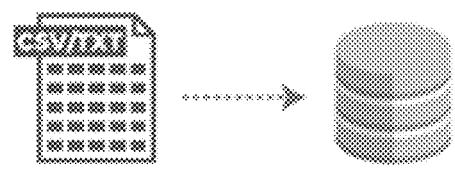

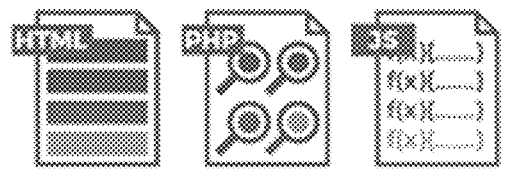

Development of web code to support dynamic queries and interactive data visualizations Hosting developed web tools and maintaining user data privacy and security

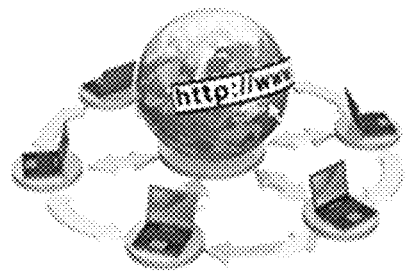

Fig. 2

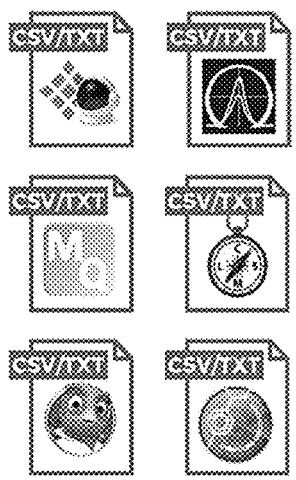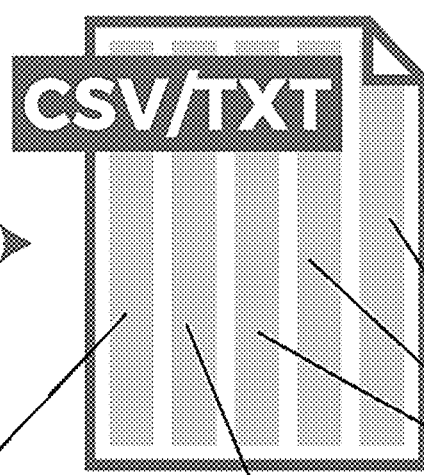
Fig. 4

Fig. 7

Web Portal Customization
User Visualization Selection
Updated Web Code
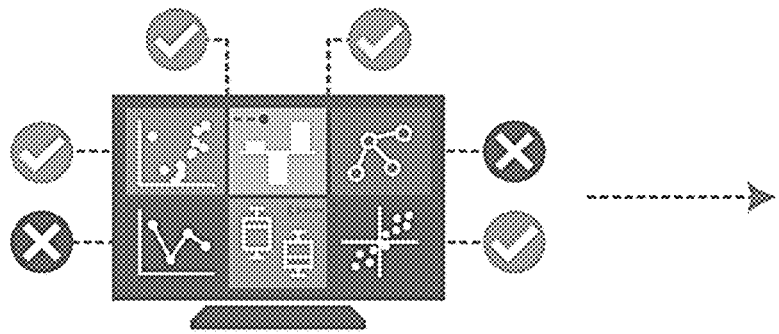
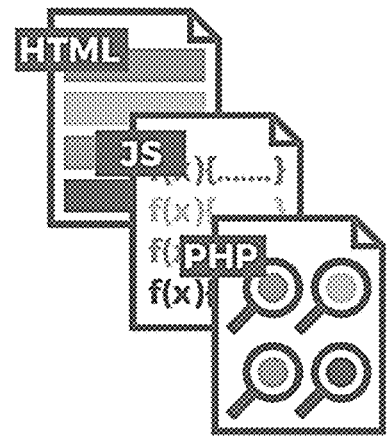
*New HTML, JavaScript, and PHP files are automatically created by concatenating pre-developed code to generate a site containing the user's selected visualizations*
Fig. 9

WEB-BASED DATA UPLOAD AND VISUALIZATION PLATFORM ENABLING CREATION OF CODE-FREE EXPLORATION OF MS-BASED OMICS DATA

CROSS-REFERENCE TO RELATED APPLICATIONS

This application is a continuation of U.S. application Ser. No. 16/049,419, filed Jul. 30, 2018, which claims priority from U.S. Provisional Patent Application No. 62/539,081, filed Jul. 31, 2017, which are incorporated by reference herein to the extent that there is no inconsistency with the present disclosure.

STATEMENT REGARDING FEDERALLY SPONSORED RESEARCH OR DEVELOPMENT

This invention was made with government support under GM108538 awarded by the National Institutes of Health. The government has certain rights in the invention.

BACKGROUND OF THE INVENTION

Recent advances in mass spectrometry profiling technologies have afforded substantial increases in both speed of data acquisition and experimental throughput. These advances have opened the door to large-scale MS-based profiling studies where the analysis of hundreds or even thousands of samples is considered routine. However, the creation of increasingly larger datasets presents a new challenge in both processing and interpretation of results. Currently, publically available tools for the analysis of large scale mass spectrometry (MS) datasets—particularly multi-omic datasets—remain poorly developed. There is a great need in the MS community for software solutions that facilitate rapid exploration, integration, and dissemination of data.

Online data analysis and visualization tools have become increasingly popular in other fields, and they stand to alleviate many of the issues associated with analysis of large datasets. Functional web-based utilities are an efficient means to share results with collaborators and minimize the burden of file transfer and version control. Further, online web-portals expedite data lookups and enable users to rapidly access and explore all measurements within a dataset. Additionally, web-based visualizations are desirable as they enable quantitative data to be automatically synthesized into plots and graphs which are more easily understood and interpretable.

However, currently the process of developing a web-based interface for MS data exploration is tedious and time consuming. Construction of these tools requires programming and web development expertise which many researchers lack. As a result, online data analysis portals are rarely developed, and if so, they are built by individual labs on a project-specific basis. To the best of the inventors' knowledge, no tools exist that support web-based data upload and subsequent code-free development of online analysis portals for MS-based "omics" data. The majority of tools available for MS data analysis are standalone software utilities, which often makes data sharing between collaborators difficult.

SUMMARY OF THE INVENTION

The present invention provides tools, particularly tools designed for non-programmers, which serve to convert data into a format that can be uploaded into existing networks, interfaced with interactive visualizations, and shared with collaborators. In an embodiment, the present invention provides a web-based tool for processing, analyzing, visualizing, storing, and sharing mass spectrometry (MS) data. Optionally, these tools also support on-the-fly hierarchical organization of data for automated statistical analysis, normalization, and comparative analysis.

In an embodiment, the present invention provides a new platform suitable for non-programmers that enables codeless generation of online MS data exploration portals. The platform facilitates upload of generic spreadsheets containing processed mass spectrometry results (e.g., peak tables) and enables on-the-fly hierarchical organization of data (e.g., grouping of replicate experiments, selection of control experiments, etc.). Following data upload, platform users can select individual visualizations to add to their custom web portal from a menu of options. Based on these selections, a complete webpage is constructed with all associated functionality embedded. These custom web portals can then be shared with collaborators and other researchers at the discretion of the creator via a developed user permissions sharing scheme. Optionally, the present invention is able to provide features such as interactive visualizations, real-time chart editing, data table look ups, data and chart downloads, co-expression analysis, hierarchical clustering, GO/KEGG enrichment, and access using electronic mobile devices.

In an embodiment, the present invention provides a computer-implemented method for generating and presenting mass spectrometry (MS) data. The method comprises the steps of: a) providing an electronic database across a network to a plurality of users; b) receiving or generating one or more electronic peak tables comprising MS data; c) assigning unique numerical identifiers to one or more subsets of the MS data in the one or more electronic peak tables, wherein the unique numerical identifiers identify data contained within the data subsets to be used in statistical analysis; d) storing the data subsets with unique numerical identifiers in the electronic database; e) performing statistical analysis of the stored data subsets thereby generating analyzed MS data; f) providing one or more data visualization options to a user through the network, wherein the one or more visualization options correspond to one or more selectable graphs, charts, tables, or combinations thereof, able to display at least a portion of said analyzed MS data; g) receiving one or more selected data visualization options from the user; and h) generating and displaying one or more graphs, charts, tables, or combinations thereof, corresponding to the data visualization options selected by the user, wherein the one or more graphs, charts, tables, or combinations thereof, are generated from the analyzed MS data.

As used herein, "peak tables" refer to spreadsheets or other types of electronic tables or records produced by MS analysis and MS processing software containing results obtained from MS experiments, including but not limited to measured mass-to-charge ratios, peak intensities, fragment information, experimental conditions, and total ion current. Peak tables can also include information such as the molecule name, Uniprot ID, structure, mass-to-charge ratios of peaks obtained during the one or more MS experiments, intensity of peaks obtained during the one or more MS experiments, and description of molecules and functional groups analyzed or detected by MS. In an embodiment, the one or more peak tables are generated by a separate MS software program following one or more MS experiments and provide data including, but not limited to, the names of molecules profiled by the one or more MS experiments, mass-to-charge ratios of peaks obtained during the one or more MS experiments, and intensity of peaks obtained during the one or more MS experiments.

Preferably, the peak tables are uploaded through the network by one or more users who have created the current project or who have been given permission to add new data to the project. Peak tables produced by current MS processing software are generally structurally similar. Accordingly, the present invention is able to extract and store data from the uploaded peak tables for further analysis and sharing with other users. To do so, the desired subsets of MS data in the electronic peak tables are identified and assigned unique numerical identifiers. For example, unique numerical identifiers are used to identify specific data in the electronic peak tables, including but not limited to molecule names, Uniprot ID numbers, molecule structure, mass-to-charge ratios, total ion current, peak intensities, descriptions of molecules and functional groups analyzed or detected by MS, and combinations thereof within the peak tables.

The data subsets with unique numerical identifiers are then stored in an electronic database having a known database management system. In an embodiment, the electronic database is stored on a server, processor, or type of searchable computer readable medium. Such databases and related database management system include, but are not limited to, MySQL, PostgreSQL, MongoDB, MariaDB, Microsoft SQL Server, Oracle, Sybase, SAP HANA, MemSQL and IBM DB2. In an embodiment, the electronic database is a structured query language (SQL) database such as MySQL.

The electronic database is searchable so that data uploaded from multiple peak tables is able to be found through a query, tracked and/or sorted. Additionally, entry of the data into the electronic database allows for easy automated processing. This allows the data to be easily compared and grouped together in different various ways. Through analysis and manipulation of the data, useful points in the data sets and outlying results can be easily detected.

In a further embodiment, the database contains MS data from multiple MS experiments, which are optionally performed and uploaded by different users. The present platform is able to combine this data, perform additional statistical analysis, and share the data between multiple users at different locations. Preferably, after the electronic peak tables are uploaded, storing the data subsets into the electronic database and performing statistical analysis of the stored data subsets are performed automatically.

A user is able to select one or more visualization options, such as graphs, charts, tables, or combinations thereof, to view the desired data. The one or more visualization options include, but are not limited to, volcano plots, bar charts, scatter plots, and principal component analysis (PCA). In a further embodiment, the present invention provides the visualization options and the generated graphs, charts, tables using a generated web portal. A "web portal" refers to a specially designed web site or electronic page on a network (such as the internet) that provides information or links to information generated or obtained from multiple sources in a uniform way. As used herein, the term "web portal" is generally used synonymously "web page". The information sources can receive a dedicated area on the page, or on an associated separate page, for displaying information which allows a user to configure or select which information sources are displayed or used to generate the desired information. Once the desired visualization options are selected by the user, the graphs, charts, and/or tables are generated from the stored MS data and displayed by the web portal.

Preferably, varying levels of access to the database and/or web portal is restricted to authorized users depending on the desired MS data to be shared and controlled. Optionally, different levels of access are provided to different users. In an embodiment, restricted access to the database is provided to users where the restricted access allows the authorized users to view the web portal and download at least a portion of the analyzed MS data. Another level of restricted access is provided to a portion of the users which further allows these authorized users to upload MS data using electronic peak tables, select data visualization options to generate the graphs, charts, tables, or combinations thereof, and to edit and/or remove the MS data. Another level of restricted access is provided to a portion of the users which further allows the authorized users the ability to grant collaborating users access to the web portal, and even the ability to delete the web portal and electronic database entirely.

In a further embodiment, the present invention further organizes the MS data in a hierarchical manner which allows related data to be grouped together, selected and viewed. Organizational identifiers are assigned to the one or more subsets of MS data after the electronic peak tables are uploaded, and the data subsets are then stored in the electronic database. The graphs, charts, tables, or combinations thereof, are then generated and displayed from analyzed MS data having the same organizational identifiers separate from analyzed MS data having different organizational identifiers. In an embodiment, the organizational identifiers comprise one or more identifiers selected from the group consisting of: project identifiers able to identify a unique MS project (as defined by the user), branch identifiers able to identify a unique collection of protein, metabolite, or lipid MS data within a MS project, peak table set identifiers able to identify MS data obtained from the same electronic peak table, condition identifiers able to identify MS data obtained from MS experiments having the same experimental conditions, experiment identifiers able to identify MS data obtained from the same MS experiment, replicate identifiers able to identify MS data obtained from a single replicate MS experiment, and combinations thereof.

In an embodiment, MS data is generated by one or more users in a method comprising the steps of: (a) providing a sample; (b) generating fragment ions from the sample; (c) measuring a fragmentation spectrum for the sample using a mass spectrometry technique, wherein the fragmentation spectrum comprises a plurality of peaks corresponding to measured mass-to-charge ratios of the fragment ions from the sample. Optionally, the MS method is tandem mass spectrometry.

In an embodiment, the present invention provides a system for generating and presenting mass spectrometry (MS) data to one or more users, said system comprising: a) an electronic host database able to store and transmit MS data; b) a host processor programmed for processing and displaying MS data to the one or more users across a network; and optionally c) a plurality of user processors interactively connected to the host processor and host database, where the user processors are able to send and receive data to the host processor and host database.

The host processor is in communication with the host database and one or more user processors and is programmed to: i) receive one or more electronic peak tables comprising MS data from at least one of the one or more users; ii) assign unique numerical identifiers to one or more subsets of said MS data in the one or more electronic peak tables based on input from the user submitting the electronic peak table, wherein the unique numerical identifiers identify data contained within the data subsets to be used in statistical analysis; iii) store said data subsets with unique numerical identifiers in the host database; iv) perform statistical analysis of the stored data subsets thereby generating analyzed MS data; v) provide one or more data visualization options to the one or more users through the network, wherein the one or more visualization options correspond to one or more selectable graphs, charts, tables, or combinations thereof, able to display at least a portion of the analyzed MS data; vi) independently receive one or more selected data visualization options from each of the one or more users; and vii) independently generate and display one or more graphs, charts, tables, or combinations thereof, corresponding to the data visualization options selected by each of the one or more users, wherein the one or more graphs, charts, tables, or combinations thereof, are generated from the analyzed MS data.

Preferably, the one or more data visualization options and resulting one or more graphs, charts, tables, or combinations thereof, are provided through a web portal provided on a network connected to the host processor. Optionally, the host processor is able to provide restricted access to a portion of the one or more users, where the authorized portion of the one or more users are able to access the electronic database, view the web portal, and/or download the analyzed MS data. In a further embodiment, the host processor is able to provide restricted access to a portion of the one or more users, where the authorized portion of the one or more users are able to submit electronic peak tables, select data visualization options to generate the graphs, charts, tables, or combinations thereof, and edit and/or remove said MS data. In a further embodiment, the said host processor is able to provide restricted access to a portion of the one or more users, where the portion of the one or more users are able to grant collaborating users access to the electronic database and web portal.

In an embodiment, the host processor is programmed to assign organizational identifiers to one or more subsets of said MS data in the one or more electronic peak tables based on input from the user submitting the electronic peak table. The host processor is then able to generate and display the MS data in an hierarchical manner, where the one or more graphs, charts, tables, or combinations thereof, are generated from analyzed MS data having the same organizational identifiers. In an embodiment, the organizational identifiers comprise one or more identifiers selected from the group consisting of: project identifiers able to identify a unique MS project (as defined by the user), branch identifiers able to identify a unique collection of protein, metabolite, or lipid MS data within a MS project, peak table set identifiers able to identify MS data obtained from the same electronic peak table, condition identifiers able to identify MS data obtained from MS experiments having the same experimental conditions, replicate identifiers able to identify MS data obtained from a single replicate MS experiment, and combinations thereof.

BRIEF DESCRIPTION OF THE DRAWINGS

FIG. 2 illustrates typical software code required to generate a website able to display experimental MS data as well as general barriers to online data analysis.

FIG. 4 illustrates features present in a typical peak table generated by standard MS quantitation tools.

FIG. 7 illustrates an exemplary web-based upload form provided to a user as a web application in an embodiment of the present invention.

FIG. 9 illustrates the customization of a web portal by the user selecting different visualization options which causes the system to automatically generate the necessary web code.

DETAILED DESCRIPTION OF THE INVENTION

Figure 1:
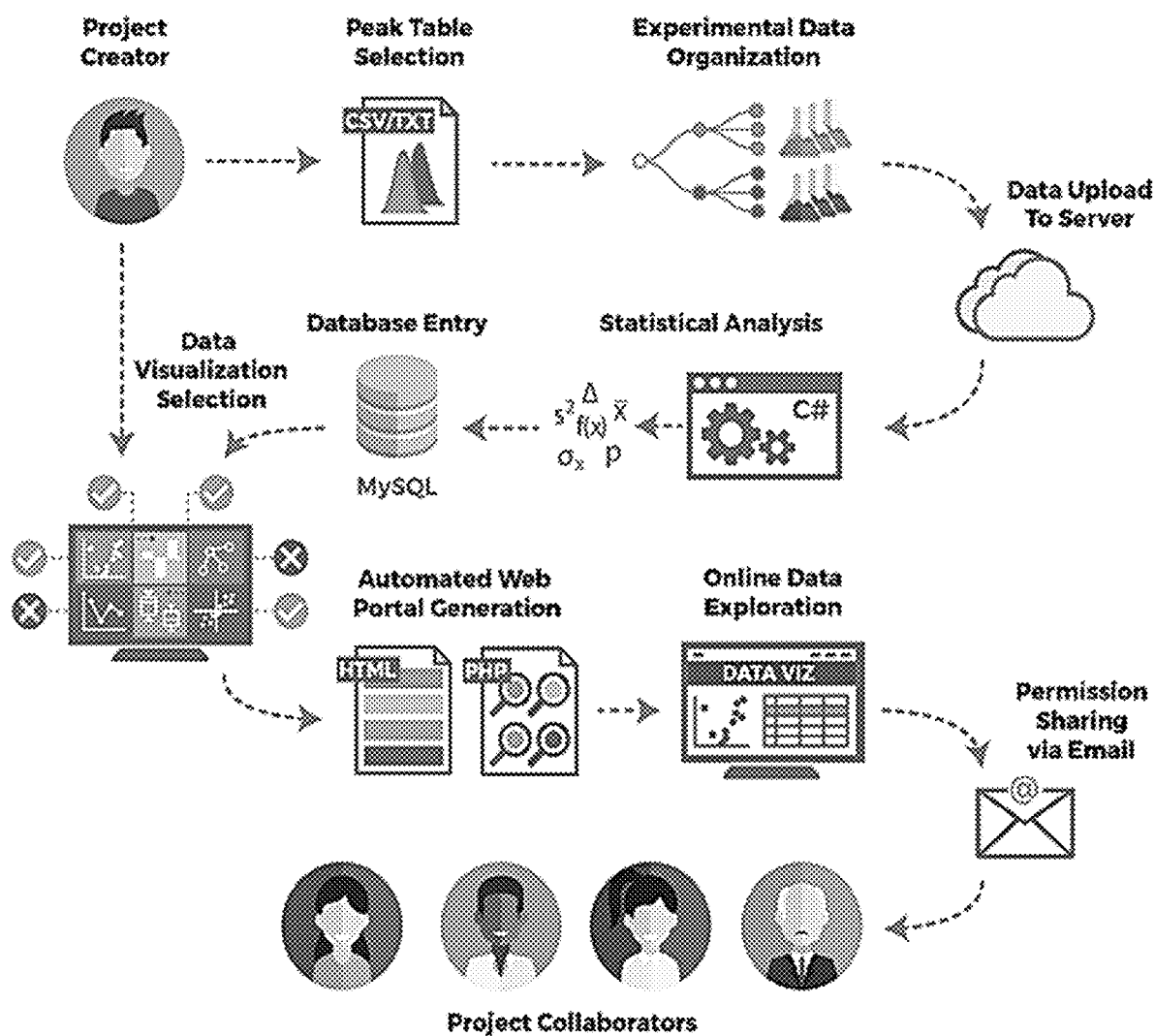
FIG. 1 is a general overview of an embodiment of the present invention showing the generation of a web portal from MS peak tables uploaded to the platform where access to the web portal is shared among multiple collaborators.

The present invention provides methods and systems facilitating the upload of generic spreadsheets containing processed mass spectrometry results (e.g., peak tables) and enables on-the-fly hierarchical organization of data (e.g., grouping of replicate experiments, selection of control experiments, etc.) (see FIG. 1). Following data upload, platform users can select individual visualizations to add to their custom web portal from a menu of options. Based on these selections, a complete webpage is automatically constructed with all associated functionality embedded. These custom web portals can then be shared with collaborators and other researchers at the discretion of the project creator via a developed user permissions sharing scheme.

Mass spectrometry (MS) has positioned itself as one of the premier tools for interrogating biological systems of interest and gaining wholesale biological insight. More and more, large scale MS studies are being undertaken to answer increasingly complex biological questions. It is imperative that software solutions continue to be developed to meet the analysis needs of these experiments. Online data analysis and exploration tools are an attractive solution, but remain underdeveloped. Both the Medicago Proteome Compendium and Y3K Project web portals—developed by the Coon Research Group (University of Wisconsin)—have enabled researchers to dig deeper into these massive sets, and have brought them to larger biological community in a format which is readily accessible from any internet browser.

However, to generate a webpage able to share significant amounts of data typically requires significant software code development (see FIG. 2). Being able to gather and organize MS data from various sources into a searchable database, develop the necessary web code to generate the webpage and support dynamic queries and data visualizations, and maintaining user data privacy and security all present significant barriers to online data analysis.

Thus, there are great challenges posed by data curation, web portal creation, and deployment of developed web tools which create a bottleneck for researchers without advanced programming skills. However, the tools described herein can greatly expedite data analysis and enable researchers to investigate their results at greater depth and pull out more useful information. The present invention directed toward a codeless web portal generation platform makes the advantages of such online tools more accessible to researchers, widens the aforementioned bottleneck, and will make online data analysis a much more tractable option for the entire research community.

EXAMPLE 1

A Platform for Codeless Generation of Custom Data Analysis Web Portals

The web tools designed and developed in support of pre-existing data analysis have undoubtedly bolstered the data analysis process and public profile of such studies. However, a great deal of work was required for each instance for building and deploying those web portals. Additionally, their construction required extensive knowledge and application of several programming languages (JavaScript, PHP, C#, etc.) and coding libraries (D3.js, Angular.js, underscore.js, etc.), as well as expertise in relational database design (MySQL) which many researchers lack. Collectively, this creates a bottleneck to the construction and publication of similar web resources. In order to extend the benefit which these data exploration solutions can provide, to a broad audience, it is essential that complimentary tools are developed to facilitate the upload, organization, processing, and eventual online visualization of MS-based omic datasets. It is imperative that these tools be designed to accommodate non-programmers, and provide a code-free development environment.

A platform designed to meet these demands is described herein. This platform facilitates upload of generic spreadsheets containing processed mass spectrometry results (i.e., peak tables) and enables on-the-fly hierarchical organization of data (i.e., grouping of replicate experiments, selection of control experiments, etc.). Following data upload, platform users can select individual visualizations to add to their custom web portal from a menu of options. Based on these selections, a complete webpage is constructed with all associated functionality embedded. These custom web portals can then be shared with collaborators and other researchers, at the discretion of the creator via a developed user permissions sharing scheme.

The following sections will describe succinctly the process of creating and sharing of a custom project web portal using this platform. Specifically these examples provide an overview of 1) the data upload process, 2) data processing and database entry, 3) visualization selection, 4) web portal sharing, and 5) developed features and functionality of these codeless web portals.

EXAMPLE 2

Data Upload

Figure 3:
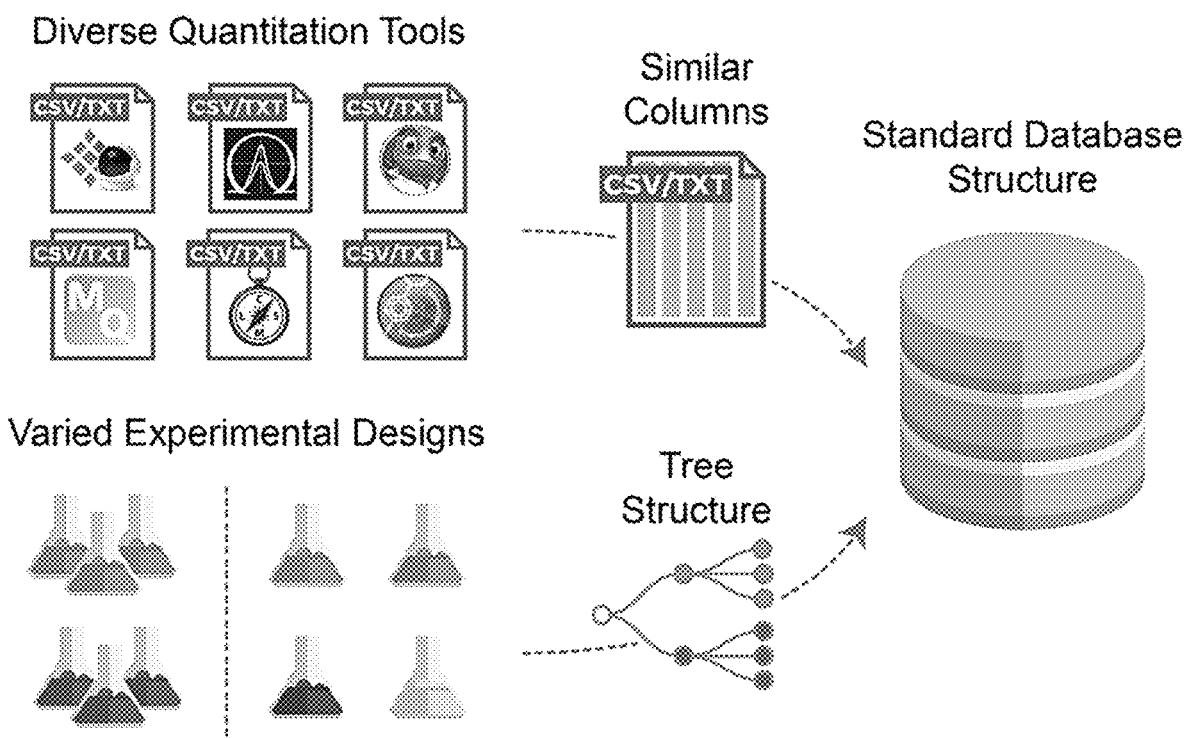
FIG. 3 illustrates data organization in an embodiment of the present invention where data from various MS quantitation tools and various experimental designs are integrated in a standard database structure.

In order to achieve the overarching goal of the platform—rapid data upload and visualization—it is critical that all uploaded data be stored using a well-defined organizational structure. Storage of data in a predictable manner enables reuse of code for queries and visualizations across projects. Specifically, this characteristic storage will allow creation of functionally similar web portals—built around unique datasets—using identical blocks of code. In the present instance, all data is uploaded to a single central relational database (MySQL) with a static table structure. In order to ensure that user data is uploaded properly to this well-defined database, a number of considerations must be made. First, it is imperative that the upload functionality be flexible enough to handle data from a broad array of experiment types (proteomics, metabolomics, lipidomics, etc.). Second, the hierarchical organization of data and the various experimental designs must be accounted for and accommodated. Finally, this upload functionality must be able to accept data processed using a variety of quantitative software packages (see FIG. 3).

There exist a large number of publically available software tools for extraction of quantitative information from raw MS data files. For proteomic analysis, software packages such as MaxQuant, COMPASS, Proteome Discoverer, and Spectronaut can be used to identify and quantify profiled peptide species, and then aggregate these quantitative values into consensus protein abundances. For metabolomic applications, tools such as XCMS, Maven, and Compound Discoverer, and high-resolution GC/MS processing suites, can be used to identify and quantify profiled small molecules. For lipidomic applications, packages such as LipidSearch or TraceFinder can be used to extract similar quantitative information. Each of these software tools are algorithmically unique and offer a range of added functionality to the user. However, all perform the same basic task—quantitation of profiled molecules—and produce output peak tables which are structurally similar. Almost all peak tables produced by MS processing software contain columns corresponding to replicate MS experiments and rows corresponding to profiled molecules (see FIG. 4). Within each replicate column, individual cells indicate the abundance/intensity of the corresponding molecule as measured in that MS experiment. Frequently, these peak tables also contain additional descriptive information about the molecules profiled (molecule names, descriptions, identifiers, etc.). The present platform capitalizes on this conserved output structure and utilizes a file upload architecture which accepts MS data from a wide variety of quantitative software packages.

To upload MS data to the platform described, a user will first create a new Project where all project-associated data will be stored and visualized. Next, a user will navigate to the Data Upload tab where they can upload generic peak tables in either comma, semicolon, or tab-delimited format. After selecting and uploading a peak table of interest the user is prompted to categorize columns of entries as either 'Unique Identifiers,' 'Feature Metadata,' or 'Quantitative Data.'

Briefly, 'Unique Identifiers' are values which uniquely represent profiled molecules inside peak tables. For instance, in proteomic analyses, standard gene names or Uniprot IDs are commonly used to represent molecules profiled across experiments. 'Feature Metadata' columns are columns which contain additional molecule descriptors that would be useful to reference during data exploration in the finished web portal. Finally, 'Quantitative Data' columns contain quantitative measurements of individual molecules from replicate MS experiments. Optionally, each column corresponds to exactly one MS experiment.

Figure 7:
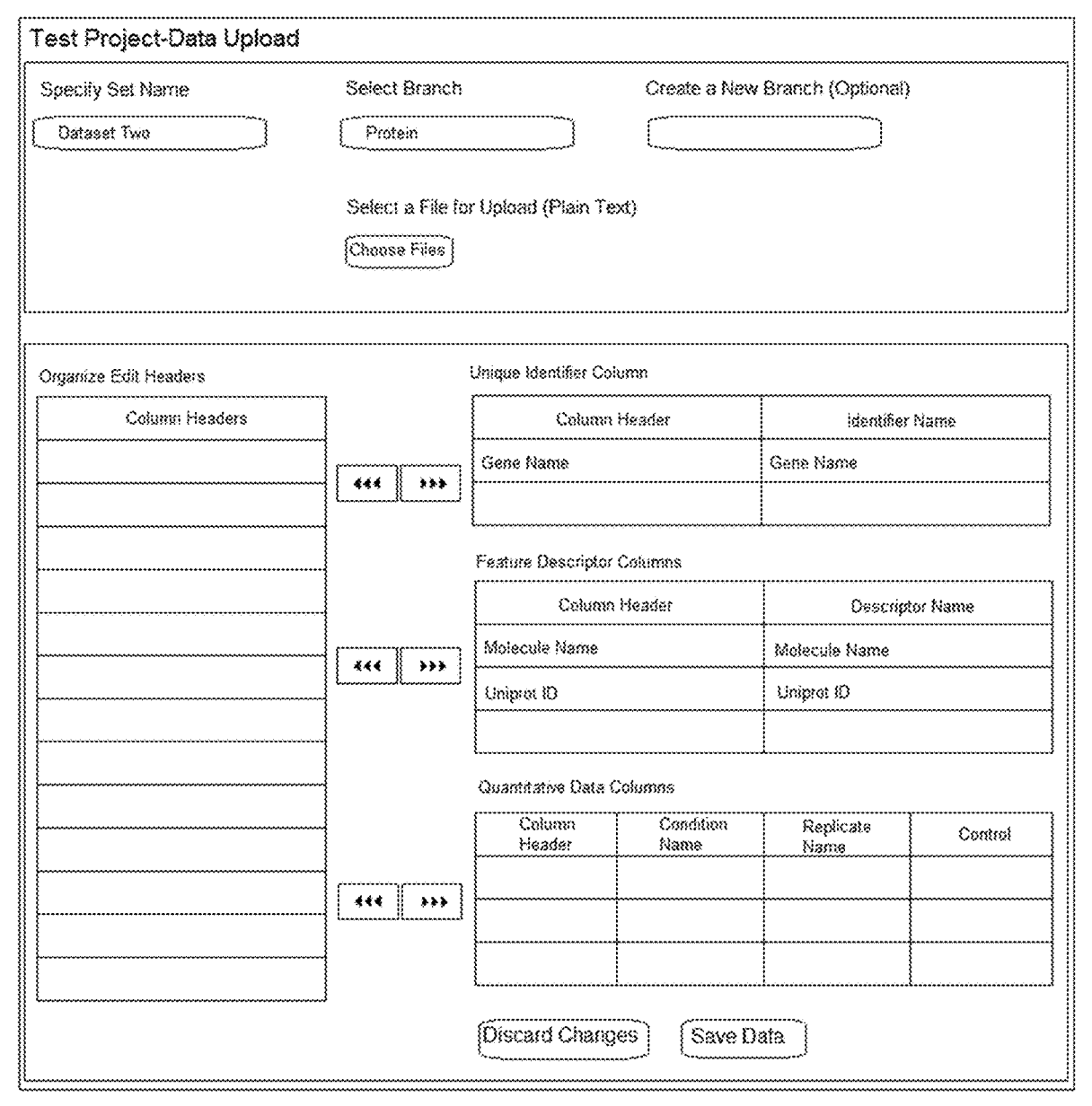

Users can organize columns by moving the corresponding headers into their appropriate bin in a web-based upload form (see FIG. 7). Before finalizing the data upload, a few pieces of additional information are requested which will help define a hierarchical organization of the user-provided data that is essential for enabling downstream statistical analysis and visualization generation.

Figure 5:
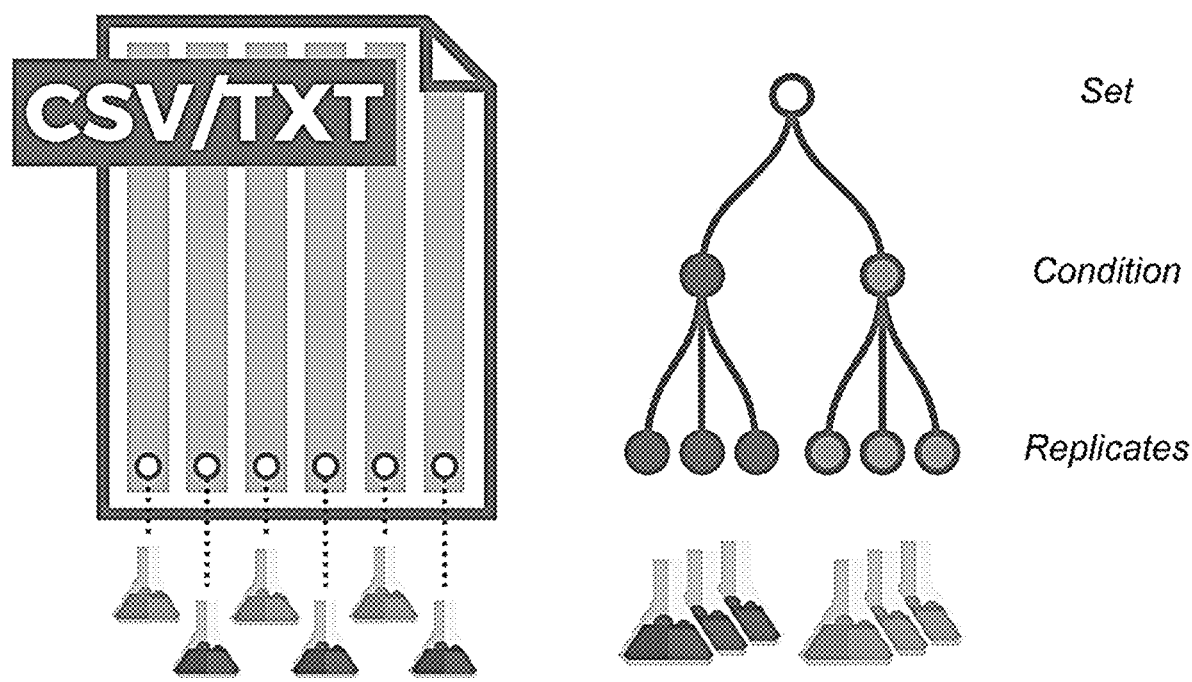
FIG. 5 shows hierarchical data organization in an embodiment of the invention encompassing an experimental set having multiple conditions and replicate experiments. Peak tables containing MS data from each set, condition, and replicate experiment are then generated.
Figure 6:
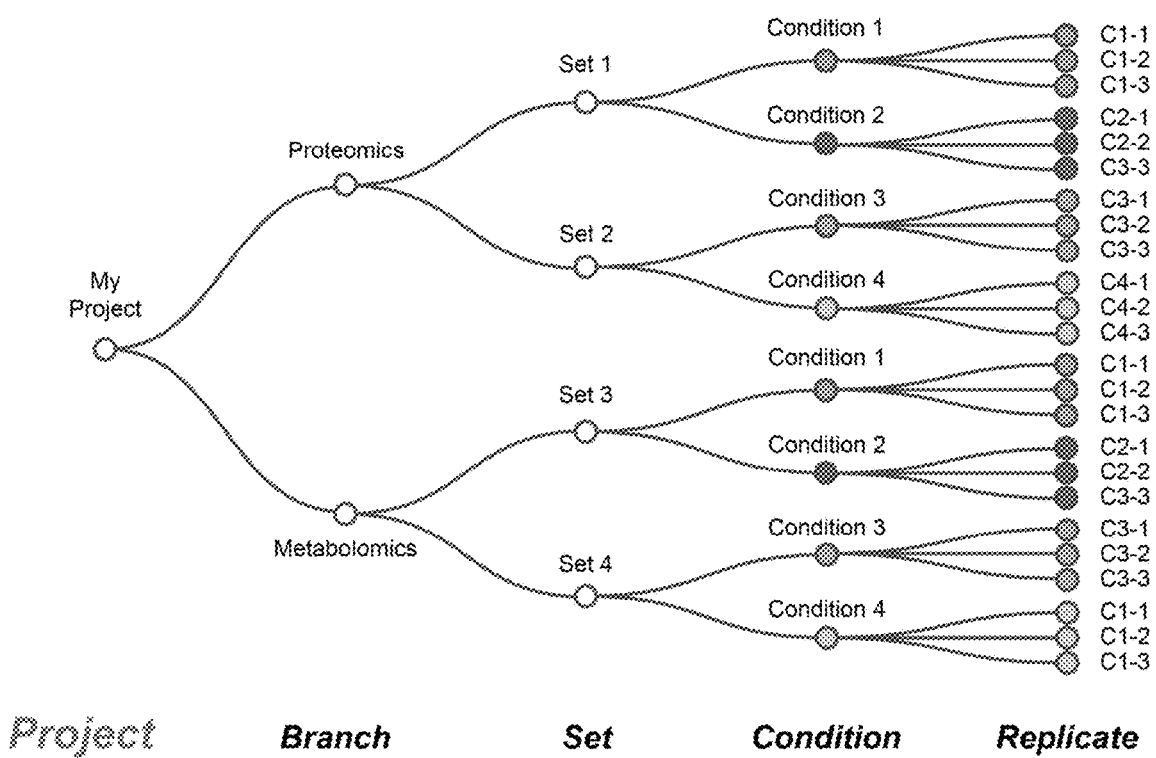
FIG. 6 shows hierarchical data organization in an embodiment of the invention encompassing a single project, multiple experimental branches (i.e., proteome and metabolome experiments), experimental sets, conditions, and replicate experiments.

A generic tree-based structure is provided which can be used to describe the organization of mass spectrometry profiling experiments of all types (see FIGS. 5 and 6). These generic trees consist of nodes at 5 levels, described here from the top down. The root node or 'Project' node at level 1 corresponds to the project that the user has created. Nodes at level 2 ('Branch' nodes) contain data which will be compared in downstream analyses. For example, a multi-omic profiling experiment may contain separate Branch nodes for protein, metabolite, and lipid data. Nodes at level 3 ('Set' nodes) contain all of the data from an uploaded peak table. If a user were to upload data from four separate peak tables into the same branch, four set nodes would be created, each containing data from one of the four files. Nodes at level 4 ('Condition' nodes) contain all replicate data corresponding to a single condition or treatment. For example, if 20 knockout yeast strains were analyzed at the protein level in biological triplicate, 20 'Condition' nodes would be created, each corresponding to one of the knockout strains. It is worth noting that Condition nodes can be specified as controls, which will then be used for normalization in downstream statistical processing. Finally, nodes at level 5 ('Replicate' nodes) contain all of the data from a single replicate MS experiment. Using the previous example of 20 knockout yeast strains profiled in biological triplicate, 60 Replicate nodes would be created, each of which would be connected to its parent Condition node. It is believed this structure can be used to describe the organizational hierarchy of nearly any MS-based profiling experiment, and that it can be exploited to logically organize quantitative MS data into easily queryable data structures.

Once values have been specified for all required fields, the user is allowed to upload their data. Before this upload process begins, the user is presented with a new dialog showing the hierarchical organization of columns in the provided data file and prompted to confirm the organization. Upon confirmation, the user-defined column organization is stored in a central MySQL database for downstream processing.

EXAMPLE 3

Data Processing and Database Entry

At this point in the generation of a custom web portal, a user has created a new Project and uploaded at least one peak table with appropriate organizational information. In order to make individual measurements accessible on-command, it is required that the data be entered into a logically-structured database (MySQL is used here) to enable subsequent querying and visualization.

For each uploaded file, entries for all column headers have been stored in a MySQL data table which indicates whether that column contains 'Unique Identifiers,' 'Feature Metadata,' 'Quantitative Data,' or if it should be discarded from subsequent processing. Each 'Quantitative Data' column is assumed to arise from a single replicate MS experiment. For these entries, the user-provided replicate name along with its associated condition is stored. Using this information values from the user-provided peak table can be extracted and inserted into a structured MySQL database.

This task is performed by a client-side script developed in C#.NET, which is executed upon user confirmation of their peak table structure.

The developed script performs two basic functions: database insertion of unique identifiers and quantitative values, statistical and descriptive analysis of the uploaded data and subsequent database insertion of results. Collectively, these processes work to convert user-uploaded data files into a format which lends itself to web-based data accession and visualization. These processes are described in more detail below.

Insertion of Unique Identifiers and Quantitative Values. For indexing and querying purposes all unique molecule, replicate, condition, and sets are assigned a unique numerical identifier. These numerical identifiers facilitate expedient reference to and querying of specific subsets of data, and are easy to manage across projects contained within a singular database.

First, unique molecule identifiers are read from the user-uploaded file, and added to the database where appropriate. Here, all existing molecule identifiers associated with the specific project are queried and stored locally. Each molecule identifier contained in the uploaded file is cross-referenced against the list of existing molecule identifiers. For those which have not yet been added to the database, they are inserted with a unique numerical identifier incremented from the last numerical identifier added. This process prevents duplicate entries from being added, and serves to associate measurements across uploaded data files. Next, each named replicate, condition, and set is added to the database, similarly with unique numerical identifiers. It is of note that these names are checked on initial data upload to avoid collisions with existing replicate, condition, and set names. Given that it is guaranteed to avoid collisions at this step, no cross-referencing against existing entries is required, and each entry is able to be added with incremented numerical identifiers. Once all molecule, condition, replicate, and set identifiers have been added to the database with appropriate numerical identifiers, the script extracts quantitative data from the uploaded file and inserts it into the database. Each quantitative measurement is added to the database with a reference to its corresponding unique molecule identifier and its unique replicate identifier. It is also of note that user options to ignore 0, empty, or null values are provided during the file upload step, along with an option to log2 transform values. This organization of measurements and identifiers in the database enables rapid querying of measurements filtered by molecule name, replicate name, condition name, set name, or any combination thereof.

Statistical and Descriptive Analysis of Uploaded Data. The described database insertion procedure for unique identifiers and quantitative data produces data table entries wherein individual measurements from the uploaded peak table are associated with single replicates. Aggregation of replicate measurements at the Condition level enables calculation of average molecule abundance, standard deviation, and coefficient of variation. Comparison of averaged abundances against control Conditions or alternatively against all other replicates in the uploaded dataset enables calculation of fold changes and statistical significance (i.e., p-values). These fold change values and p-values can be further exploited in various computation processes such as unique genotype—phenotype scanning and principal components analysis. These calculations and computational processes are automated.

First, all Replicate measurements are grouped together at the Condition level. Using these grouped measurements average abundance, standard deviation, and coefficient of variation are calculated and stored. Calculations of fold change and p-value are performed two ways for each profiled molecule. First, a mean-normalization strategy is utilized wherein each averaged abundance from each condition are normalized to the average abundance of all replicate measurements. Here, p-values are calculated by performing a two-sided Student's t-test (homostatic) using grouped replicate values from each Condition and all other replicate values (non-inclusive) as inputs. In the case that a particular Condition has been indicated as a control, control-normalized fold changes and p-values are also calculated. Here average abundance measurements from each condition are normalized against the average abundance of the associated control condition. P-values are calculated by performing a two-sided Student's t-test (homostatic) using grouped replicate values from each condition, and grouped replicate values from the control condition as inputs. In all cases, p-values are adjusted using the Benjamini-Hochberg FDR and Bonferroni adjustment procedures, to account for multiple hypothesis testing. These adjusted values are stored locally in addition to the unadjusted p-value.

Following calculation of descriptive statistics, fold changes, and p-values, an outlier (unique genotype—phenotype scanning) and principal components analyses are performed. These analyses (or variations thereof) are frequently employed by systems biologists as they can rapidly identify characteristic molecule—condition relationships, and inform functional similarity between profiled conditions and replicates. In both cases, mean-normalized values and control-normalized values (if available) are used as inputs. The genotype—phenotype scanning procedure produces a Euclidean distance calculation, an outlier condition identifier, and an enum type indicating whether the outlier measurement was increased or decreased from the mean. The principal components analysis procedure is performed twice, first averaged molecule fold changes from all Conditions, then using molecule abundances from all replicates. In both cases the analysis produces scaled vectors and variance fractions corresponding to each numbered principal component as outputs. All of these data are stored locally.

Upon completion of all described processing, calculated values are stored in logically organized data tables in the MySQL database. In all cases, columns indicating associated molecule, replicate, condition, and set identifiers are included in these data tables to expedite queries and minimize the need for complex data joins. These data are now well formatted for the purposes of online visualization. Further, this conserved database structure greatly facilitates the reuse of developed code as data from multiple projects can be stored in exactly the same manner.

EXAMPLE 4

User Visualization Selection

At this point in the web portal generation process, users have uploaded peak tables complete with associated organizational information, data from these files has been inserted into appropriate data tables in a central MySQL database, and results from statistical and descriptive analyses has been stored. All of these tasks were achieved with minimal user interaction. In fact, all that was requested of a user is that they upload a file, organize and appropriately name data columns, and confirm the data organization. No new code generation has been required of the user, only simple tasks which can be completed in minutes for modestly sized datasets.

Most data visualizations have well-defined inputs. For example, volcano plots contain data points having a fold change (x-axis) and significance component (y-axis; typically −log10[p-value]). Similarly, bar charts contain bars having numerical (y-axis) and positional components (x-axis), and often error bars showing variance or standard deviation in the numerical component (y-axis). Granted that these, and other, visualizations have defined inputs they can be made available to users by simply requesting that they specify what values should be used as inputs.

Figure 8:
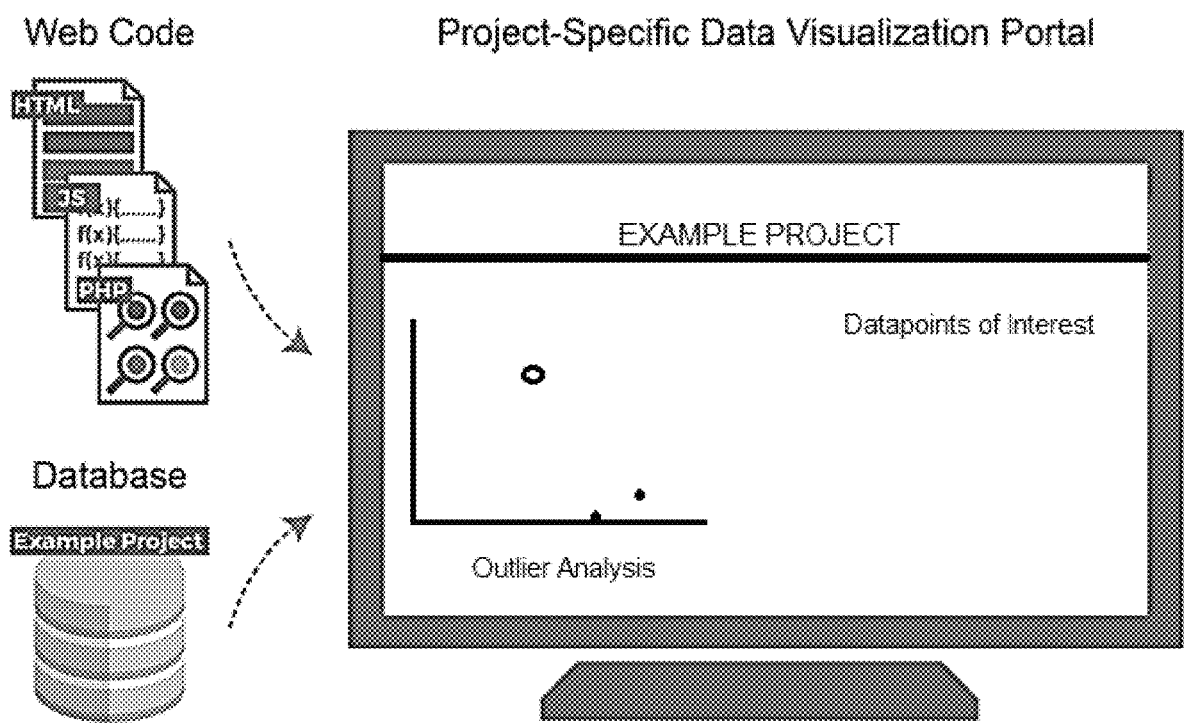
FIG. 8 illustrates an interactive web portal generated in an embodiment of the present invention where the system generates the necessary web code and extracts the necessary data from the database to create the web portal.

Following data upload, users can navigate to a 'Project-Specific Data Visualization Portal' or 'Manage Visualizations' tab where a menu of visualization options is presented (see FIG. 8). This menu represents all of the visualizations which are available to be integrated into a user's custom web analysis portal. Among the offered visualizations are Volcano Plot—Full Perturbation Profile, Bar Chart—Molecule Perturbations, Scatter Plot—Condition vs. Condition, PCA—Conditions, PCA—Replicates, and Outlier Analysis. It is worth noting that these visualizations reflect an early development set which will continue to grow. These visualizations were chosen as they are commonly used by researchers to explore omics data. Selecting the desired visualization tools will cause the system to generate the necessary web code needed to create the web portal displaying the data.

For each listed visualization a description is included along with an input selection drop down menu and an "on/off" toggle. The input selection list indicates what values the user wishes to use to generate a particular visualization. For instance, under the Bar Chart—Molecule Perturbations input selection the following options are listed: Control-Normalized, Mean-Normalized, and Log2 Intensity. Each of these options reflects one way in which changes in molecule abundance across Conditions can be visualized; control-normalized will display control normalized fold changes, mean-normalized will display mean-normalized fold changes, and log2 intensity will display unnormalized log2 molecule intensities. After selecting the appropriate inputs for desired visualizations, the user will toggle those visualizations to the 'On' state and save their selections by clicking the 'Save Changes' button. Clicking the 'Save Changes' button stores the user's visualization selection in a data table, and triggers an event which automatically builds a new webpage with all visualizations embedded.

Briefly, for each project a new directory is created on the webserver. The files contained in this directory are used to render the web portal in a browser, perform server-side database queries, and display all returned results in the form of interactive visualizations (see FIG. 8). This compartmentalized structure is desirable as it greatly simplifies restructuring of individual project websites and the process of website migration to a new webserver or domain. The event fired by clicking 'Save Changes' launches an executable (C# .NET) which updates all of the files in the project directory. First, a new webpage is generated by concatenating segments of developed code (stored in the root folder of the webserver) to create a fully functional interface with different visualizations embedded. For instance, if a user selected 'Volcano Plot—Full Perturbation Profile' and 'PCA—Replicates' only code segments required to display these two plots would be added to the new webpage. This concatenation process is extremely quick to execute (<1 second) and completely overwrites the existing webpage allowing users to re-select visualizations and recreate custom web portals ad infinitum.

In addition to generating a new webpage, individual PHP files containing server-side query commands are updated (see FIG. 9). For each visualization, the user-selected inputs are specified and PHP files containing relevant commands are updated to reflect the requested data. This process of automatically updating server-side queries simplifies client-side operations by masking the underlying data requests. Further, restricting query results to include only those values desired by the user reduces the volume of data returned by a single query and bolsters performance. Additionally, preparing and storing all MySQL queries on the server-side of the application affords an added layer of security in prevention against SQL injection attacks.

Immediately after these text files are updated in the project directory the new web portal can be explored by the user. As mentioned, this portal can be updated to include different visualizations, and tailored specifically for the user's project.

EXAMPLE 5

Web Portal Sharing

Figure 10:
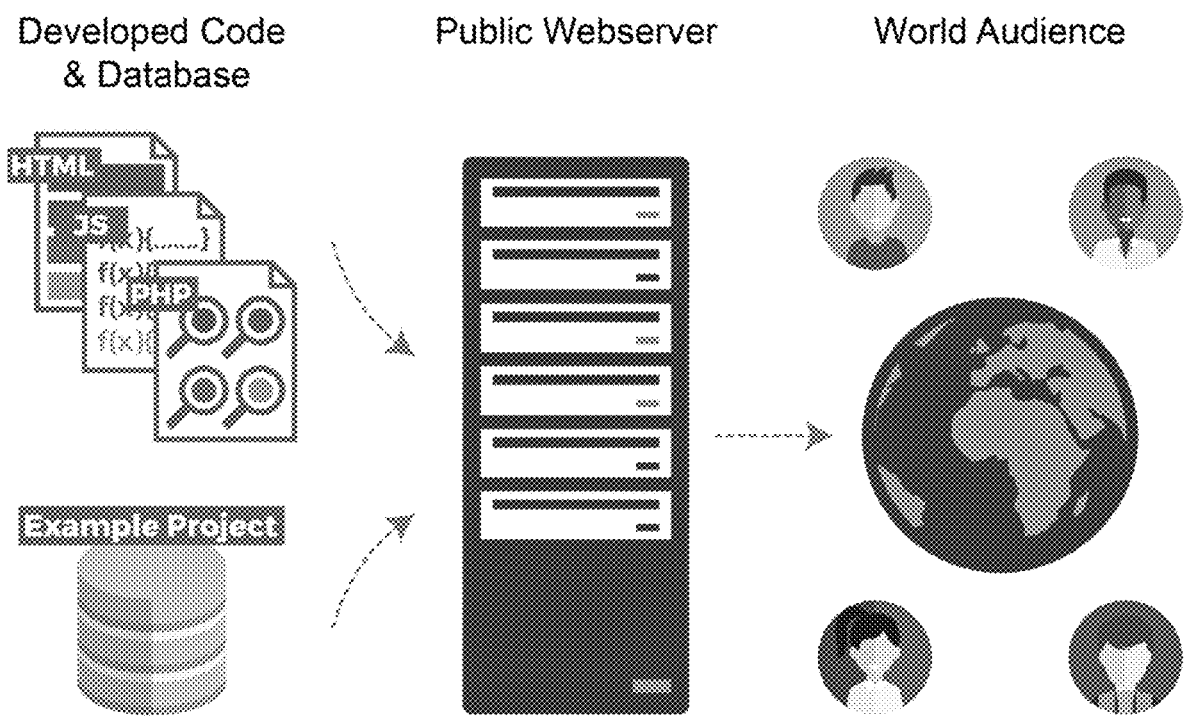
FIG. 10 illustrates the dissemination of data through a public webserver to different users in different geographical locations.

At this point in the web portal creation process, the user has uploaded data with associated organization information, all data has been processed and added to appropriate data tables, the user has selected visualizations (and inputs) of interest and a new web portal has been created. All of this has been achieved by requiring a user to perform simple tasks, and no new software code has to be generated on the part of the user. At this point, the only user who can view the newly generated web portal is the creator. However, this user also has the exclusive ability to grant others access to the project's portal hosted on the public webserver (see FIG. 10).

Figure 11:
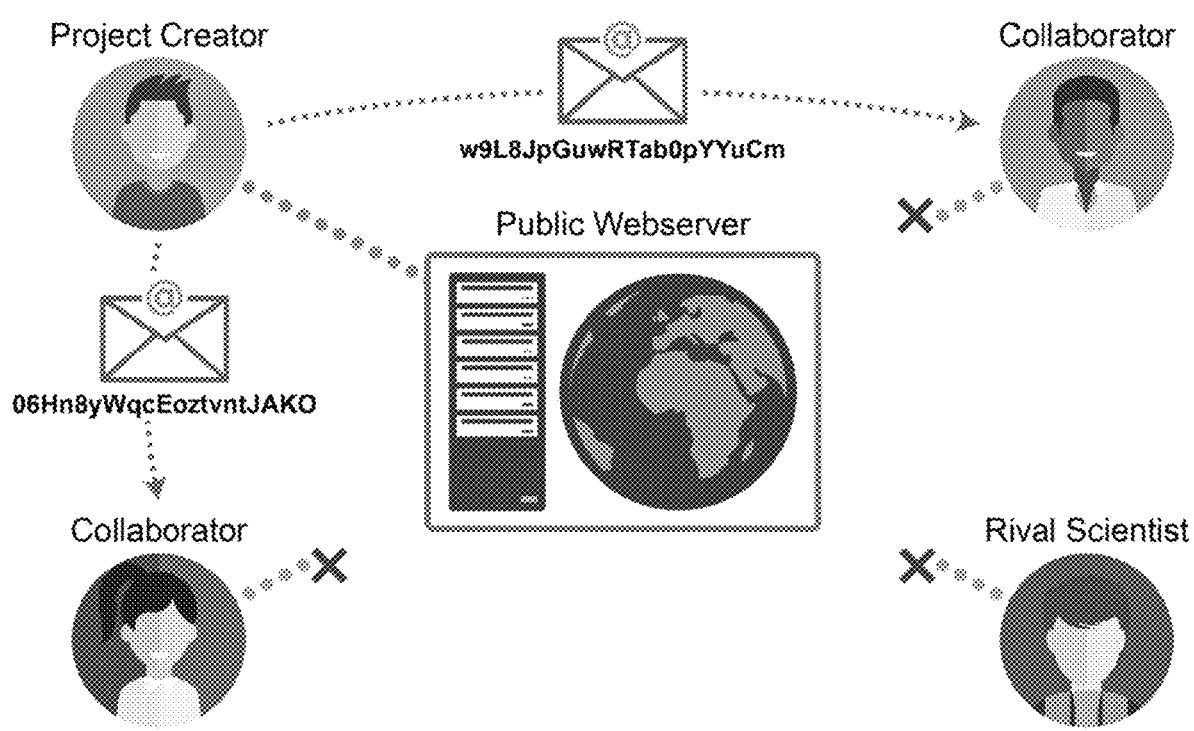
FIG. 11 illustrates the permission sharing to a public webserver containing the data by using email to send access passwords to selected collaborators.

For example, the project creator can authorize collaborators to access the project data on the webserver. A unique project password is provided to each designated collaborator which allows them to logon the webserver, while unauthorized personnel will be unable to have access to the project data (see FIG. 11).

Briefly, the platform provides a permissions scheme consisting of three levels. Level one (read-only access) provides users with the ability to view developed web portals and download associated data. Level two (read/edit access) provides users with all level one permissions, in addition to the ability to add, remove, and edit uploaded data. Level three (project owner access) provides users with all level one and two permissions, in addition to the ability to grant collaborating users access to the web portal, as well as the power to delete the web portal entirely. These permissions were designed to afford the appropriate amount of control to individual users so they can effectively utilize and share these tools with collaborators while maintaining privacy and security of their data.

By default, the only user who is initially granted access to a project's web portal—other than administrators and other super users—is the creator. The creator is the default 'Project Owner' which grants them all of the permissions listed above. Project owners are the only users who have the ability to provide access to other collaborators affording complete discretion over who can utilize their data. Project access can be managed under the 'Manage Visualizations' tab. Upon navigating here, users can enter collaborator email addresses along with a short message, and specify an appropriate permission level for the collaborator in question. Clicking 'Send Invite' triggers a series of events culminating in invitations being sent to the specified collaborators. In this process, a unique 20-digit alphanumeric code is randomly generated (there exist $>7.04 \times 10^{35}$ possible combinations) for each invited collaborator and stored in the central database along with information about the project and the project owner-specified permission level. Then, each collaborator is automatically emailed their specific 20-digit alphanumeric code along with the owner's message and a link to the website. After navigating to the site and either logging in (for current users) or creating an account, invited users can select 'Accept Invitation' where they are prompted to enter their emailed 20-digit code. This code is then checked against the data table containing all sent codes for a matching entry. If a match is found, the user is granted access to the associated project—with the appropriate permissions—and the project is added to a list of web portals which they are able to interact with and explore.

EXAMPLE 6

Developed Features and Functionality

Collectively, the previously described processes have enabled the creation of project-specific web portals without requiring any coding on the part of users. All user tasks are straightforward and can be performed in a web browser without requiring the download or installation of any software tools. This platform will have widespread utility for mass spectrometrists and other biological researchers who routinely interact with MS-based omics data. To make these developed web portals as useful as possible, a number of unique features and functionality have been developed including interactive visualizations, informative tooltips, real-time chart editing, data and chart downloads, and data table lookups. These developed features will be described briefly below.

Interactive Visualizations. All user-selected visualizations are created using the D3.js JavaScript library. D3 (Data Driven Documents) is a well-developed and well-supported library for displaying data in the form of interactive charts in web applications. This library is widely used and has a strong community following which is a valuable resource that makes it easier to develop, maintain, and debug code for displaying data. All developed visualizations are designed to be highly interactive and users can easily select data to visualize by choosing options from lists of valid inputs. Animations are employed when transitioning between datasets for all visualizations and data point indexes are used to maintain object consistency (i.e., the same data point represents the same molecule, condition, etc. before and after a transition). This object consistency provides useful visual cues to the user about how individual measurements differ between selected conditions, for instance.

Informative Tooltips. All developed visualizations also support informative tooltips. Within each plot, hovering over an individual data point displays a tooltip which contains relevant metadata about the molecule, measurement, condition, etc. in question. These tool tips enable users to rapidly identify data points of interest and retrieve more information about that measurement. In contrast to static plots, this display of tool tips greatly increases the amount of information which can be transferred to a user per unit time, expediting the data analysis process.

Real-Time Chart Editing. All visualizations were designed to employ differential coloring schemes and data filters. For instance, generated volcano plots use a three color scheme to indicate significance and fold change. For these plots, controls were built for dynamically resetting fold change and p-value cutoffs which will automatically recolor data points in the chart appropriately. Chart filters are also employed to selectively display only those data points which meet certain fold change and p-value thresholds. Additionally, an option is included to set fixed scales to axes in generated plots. Changes to these settings are automatically rendered in the associated visualization providing users an additional level of control over their data.

Data and Chart Downloads. For communicating data to other scientists, either in communications or publications, it is often helpful to include individual plots. To make web-portal generated plots more useful for researchers an option to download all data associated with a particular plot can also be made available. Here, by clicking a button a user can download a tab-delimited file containing all of the numerical and textual information used to generate a particular visualization. From here, users can port data into their favorite plotting software package and generate new plots for sharing. Additionally, an option to download generated plots directly in .SVG format is provided. This format can be imported directly into graphics editors (such as Adobe Illustrator or Microsoft PowerPoint) and each plotted object can be manipulated to adjust color, size, opacity, etc. to the user's liking.

Data Table Lookups. While visual display of data is highly useful, it is often advantageous to explore data in numerical format. Within each developed web portal a data table lookup option is provided by default. Individual query terms corresponding to all project-specific replicates, conditions, and profiled molecules have been created and stored in the database. By selecting any one of these query terms, all associated data is returned and displayed in tabular format. This data table is interactive and supports filtering, sorting, column hiding, and pagination of results to make it easier to navigate to individual pieces of data. All queried results can also be downloaded in tab-delimited format for additional plotting and analysis at the discretion of the user.

Additional functionality is also available including gene ontology enrichment, coexpression analysis, and hierarchical clustering. The overall web design can also be bolstered to make exploration and analysis more intuitive for all users. Data security and privacy are concerns for all scientists, and, as such, it must be ensured that all data is well-protected while remaining accessible to collaborators worldwide. Increasingly, researchers are analyzing data on numerous devices including mobile and tablet and it is advantageous that the present system supports these platforms. Finally, the present system should promote data sharing between individuals so that multiple datasets can leveraged against one another to synergistically enhance the insight afforded. The present system is uniquely positioned in that it can host multiple datasets from a singular location making inter-project data comparison a very manageable option.

Having now fully described the present invention in some detail by way of illustration and examples for purposes of clarity of understanding, it will be obvious to one of ordinary skill in the art that the same can be performed by modifying or changing the invention within a wide and equivalent range of conditions, formulations and other parameters without affecting the scope of the invention or any specific embodiment thereof, and that such modifications or changes are intended to be encompassed within the scope of the appended claims.

When a group of materials, compositions, components or compounds is disclosed herein, it is understood that all individual members of those groups and all subgroups thereof are disclosed separately. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. Additionally, the end points in a given range are to be included within the range. In the disclosure and the claims, "and/or" means additionally or alternatively. Moreover, any use of a term in the singular also encompasses plural forms.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements.

One of ordinary skill in the art will appreciate that starting materials, device elements, analytical methods, mixtures and combinations of components other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. The invention illustratively described herein suitably may be practiced in the absence of any element or elements, limitation or limitations which is not specifically disclosed herein. Headings are used herein for convenience only.

All publications referred to herein are incorporated herein to the extent not inconsistent herewith. Some references provided herein are incorporated by reference to provide details of additional uses of the invention. All patents and publications mentioned in the specification are indicative of the levels of skill of those skilled in the art to which the invention pertains. References cited herein are incorporated by reference herein in their entirety to indicate the state of the art as of their filing date and it is intended that this information can be employed herein, if needed, to exclude specific embodiments that are in the prior art.

The invention claimed is:

1. A computer-implemented method for generating and presenting mass spectrometry (MS) data comprising the steps of:
 a) providing an electronic database across a network to a plurality of users;

b) performing a plurality of MS experiments, wherein performing each MS experiment comprises generating fragment ions from a sample comprising a protein, metabolite, or lipid, measuring a fragmentation spectrum for the sample, wherein the fragmentation spectrum comprises a plurality of peaks corresponding to measured mass-to-charge ratios of the fragment ions from the sample, and generating multiple electronic peak tables comprising MS data,
wherein the plurality of MS experiments comprises analyzing samples from at least two groups selected from the group of protein samples, metabolite samples, and lipid samples;
c) performing at least one replicate MS experiment having experimental conditions that are the same as at least one of the plurality of MS experiments, wherein performing each replicate MS experiment comprises generating fragment ions from a second sample comprising a protein, metabolite, or lipid that is the same as at least one of the plurality of MS experiments. measuring a fragmentation spectrum for the second sample, wherein the fragmentation spectrum comprises a plurality of peaks corresponding to measured mass-to-charge ratios of the fragment ions from the second sample, and generating additional multiple electronic peak tables comprising MS data;
d) assigning unique numerical identifiers to one or more subsets of said MS data in said electronic peak tables from the plurality of MS experiments and the at least one replicate MS experiment, wherein the unique numerical identifiers identify data contained within the data subsets to be used in statistical analysis;
e) assigning organizational identifiers to said one or more data subsets, wherein the organizational identifiers comprise:
  i) one or more project identifiers, each project identifier able to identify a unique MS project;
  ii) one or more branch identifiers, each branch identifier able to identify a unique collection of protein, metabolite, or lipid MS data able to be compared in downstream analyses;
  iii) one or more peak table set identifiers, each peak table set identifier able to identify MS data obtained from the same electronic peak table;
  iv) one or more condition identifiers, each condition identifier able to identify MS data obtained from MS experiments having a same specified experimental condition; and
  v) one or more replicate identifiers, each replicate identifier able to identify MS data obtained from a single replicate MS experiment relating to a specific molecule, wherein MS data obtained from a single replicate MS experiment is also assigned one or more condition identifiers;
f) storing said data subsets with organizational identifiers and unique numerical identifiers in said electronic database;
g) determining average molecule abundance from the electronic peak tables of specific molecules present in the replicate MS experiments having the same specified experimental condition from said stored data subsets and performing statistical analysis of said stored data subsets thereby generating analyzed MS data containing quantitative data of said specific molecules;
h) providing one or more data visualization options to a user through the network, wherein said one or more visualization options correspond to one or more selectable graphs, charts, tables, or combinations thereof, able to display at least a portion of said analyzed MS data;
i) receiving one or more selected data visualization options from the user;
j) generating and displaying one or more graphs, charts, tables, or combinations thereof, corresponding to the data visualization options selected by the user, wherein the one or more graphs, charts, tables, or combinations thereof, are generated from analyzed MS data, wherein analyzed data relating to said specific molecules is searchable using organizational identifiers selected by the user; and
k) providing a web portal, wherein the web portal displays the available graphs, charts, tables, or combinations thereof, from the analyzed MS data to the user and allows the user to select the desired graphs, charts, tables, or combinations thereof, based on the organizational identifiers.

2. The method of claim 1 wherein the one or more peak tables are generated by a separate MS software program following one or more MS experiments and include data comprising names of molecules profiled by the one or more MS experiments, mass-to-charge ratios of peaks obtained during the one or more MS experiments, and intensity of peaks obtained during the one or more MS experiments.

3. The method of claim 2 wherein the unique numerical identifiers identify the one or more subsets of said MS data corresponding to the molecule names, mass-to-charge ratios, peak intensity, and combinations thereof from the one or more peak tables.

4. The method of claim 1 wherein performing statistical analysis of said stored data subsets comprises the step of combining MS obtained from multiple MS experiments.

5. The method of claim 1 wherein the steps of storing the data subsets in the electronic database and performing statistical analysis of the stored data subsets are performed automatically.

6. The method of claim 1 wherein the one or more visualization options comprise volcano plots, bar charts, scatter plots, and principal component analysis (PCA).

7. The method of claim 1 further comprising providing restricted access, wherein said restricted access allows an authorized user to view the web portal and download the analyzed MS data.

8. The method of claim 7 wherein said restricted access further allows an authorized user to upload MS data to the database using the one or more electronic peak tables, select data visualization options to generate the graphs, charts, tables, or combinations thereof, and to edit and/or remove said MS data.

9. The method of claim 7 wherein said restricted access further allows an authorized user the ability to grant collaborating users access to the web portal and electronic database, and the ability to delete the web portal and electronic database entirely.

* * * * *